United States Patent

Closs et al.

[15] 3,647,949

[45] Mar. 7, 1972

[54] VIDEO MULTIPLEXING SYSTEM

[72] Inventors: Felix H. Closs, Adliswill, Zurich; Dieter Seitzer, Gattikon, Zurich; Peter Stucki, Adliswill, Zurich, all of Switzerland

[73] Assignee: International Business Machines Corporation, Armonk, N.Y.

[22] Filed: June 23, 1969

[21] Appl. No.: 835,437

[30] Foreign Application Priority Data

July 12, 1968 Switzerland ..........10498/68

[52] U.S. Cl. ..........178/5.6, 178/DIG. 23, 179/15 BA
[51] Int. Cl. .......... H04n 7/68
[58] Field of Search ..........178/DIG. 3, DIG. 23, 5.6; 179/15.55, 15 BA; 325/55

[56] References Cited

UNITED STATES PATENTS 2,719,188 9/1955 Pierce ..........179/15 A
3,197,563 7/1965 Hamsher et al. ..........179/15 A
3,199,081 8/1965 Kok et al. ..........179/15 A
3,309,461 3/1967 Deutsch ..........178/6 BW

*Primary Examiner*—Robert L. Griffin
*Assistant Examiner*—Donald E. Stout
*Attorney*—Hanifin and Jancin and John A. Jordan

[57] ABSTRACT

A system is provided for the simultaneous transmission of pictures between a plurality of scanning stations and a plurality of corresponding receiver stations. The pictures to be transmitted comprise two levels of brightness such as, for example, a document having black print on a white background. Each of the scanning stations scans, in a pseudorandom fashion, its respective picture to provide an output signal indicative of the information on one of the levels of brightness, as for example, the black print information on the document. This information output signal is then multiplexed.

A coder and multiplexer upon receiving an information signal, during a given time interval, from one of the scanning stations generate an address signal corresponding to the address of the station providing the information signal whereupon the address signal is transmitted to a decoder at the receiving end for decoding and providing an information signal to the appropriate receiver. When the coder and multiplexer simultaneously receive information signals from two scanning stations within a given time interval a priority control circuit selects one of the signals.

17 Claims, 7 Drawing Figures

INVENTORS
FELIX H. CLOSS
DIETER SEITZER
PETER STUCKI

BY John A. Jordan
ATTORNEY

61

64

| | | | | | | | |
|---|---|---|---|---|---|---|---|
| 0 | 32 | 8 | 40 | 2 | 34 | 10 | 42 |
| 16 | 48 | 24 | 56 | 18 | 50 | 26 | 58 |
| 4 | 36 | 12 | 44 | 6 | 38 | 14 | 46 |
| 20 | 52 | 28 | 60 | 22 | 54 | 30 | 62 |
| 1 | 33 | 9 | 41 | 3 | 35 | 11 | 43 |
| 17 | 49 | 25 | 57 | 19 | 51 | 27 | 59 |
| 5 | 37 | 13 | 45 | 7 | 39 | 15 | 47 |
| 21 | 53 | 29 | 61 | 23 | 55 | 31 | 63 |

VIDEO MULTIPLEXING SYSTEM

BACKGROUND OF THE INVENTION

The invention relates to a method and apparatus for simultaneous transmission of pictures between a plurality of scanning and receiver stations. More than one picture, each consisting of elements of two levels of brightness, is scanned simultaneously whereby electrical video signals corresponding to the information content of the pictures are generated. The signals are applied to input channels of a multiplexer, the output terminals of which are connected to one or more transmission lines.

In order to make more efficient use of the lines employed for information transmission which, in particular for long distance connections such as transatlantic cables, are very expensive, so-called multiplexing techniques have been developed and employed. These techniques are based on the knowledge that the information content of, for example, a voice channel, does not make full use of the transmission capacity or bandwidth of wide-band transmission lines. In addition, advantage has been taken of the fact that after the setting up of a connection between an emitting station and a receiver, information signals are not transmitted continuously as can be seen, for example, from the fact that a voice channel is not effectively used during a pause. When a transmission line is used for a single connection only, the line is not used during such pauses and the like whereas the line can be used practically 100 percent of the time if suitable multiplexing methods are employed. As an aid to understanding the novel concepts of the present invention, a few of the known multiplexing techniques employed for voice transmission will now be described.

One of the known multiplexing techniques employed for voice transmission is the so-called TASI system described in the article "Time Assignment Speech Interpolation" by C. E. E. Clinch in *The Post Office Electrical Engineer Journal*, 53/1960, Part I, pages 197—200. Such a system has been employed in transatlantic communication. With the aid of relatively complex and costly circuitry up to 72 connections can be handled when using only 36 transmission lines. This is possible because of the fact that each transmission channel used for one-way transmission is utilized only, at the most, during 50 percent of the whole connection time. Each time a subscriber starts to talk, a through-connection is set up by a central control unit and the connection is maintained only during effective speech transmission. Due to the relatively low compression factor (72:36 =2) the extensive equipment required is justified only for very expensive transmission lines. Those speech signals occurring during the setting-up period of the connection (minimum 20ms.) Practical lost. Practical operation of the system has, however, proved that these losses do not seriously distort the speech quality. In the transmission of video signals, where each single signal contains essential information content and where a new connection may be needed for each picture element, such a system operated by a central control cannot be employed.

In the so-called Pulse Code Modulation method (PCM) knowledge is used of the fact that it is sufficient for a good speech quality at the receiver to transmit an analog signal, for example a voice signal, by sampling the analog signal in short time intervals and transmitting only the sampled instantaneous values, providing the sampling frequency is at least twice as high as the highest frequency contained in the voice signal. The bandwidth of a wide-band transmission line permits transmission of these instantaneous values, which are usually binary coded, simultaneously for a plurality of speech channels such that the instantaneous values of all channels are serially transmitted during a sampling interval. The information content of the speech signal is contained in the code, whereas the address of the receiver is determined by the time position of the code signals within the time interval. Because a predetermined time position within the sampling interval is allocated to each connection, the pauses in a speech connection are not fully utilized when employing this method and the savings in transmission line capacity are limited.

A further multiplexing system for voice transmission is described in an article "Eine 30-Kanal Multiplexeinrichtung nach dem lagemodulierten Addressencode-system" by E. Acs and O. Hutter, published in *Nachrichtentechnik* 17, 1967, pages 55–58. In this system, which is in principle very similar to a PCM system, the functions of code and position as information carrier are reversed; the address is contained in the code whereas the information content of the speech signal is given by the time position of the code signals. The voice signals of a plurality of input channels are compared with a reference signal, the amplitude of which assumes all amplitude values from zero to maximum during each scanning interval. Each time speech and reference signals are of the same amplitude, the address of the corresponding input channel is transmitted. If two or more speech signals have the same amplitude, simultaneously, the signal of only one channel is transmitted in the form of its address; transmission of the other signals is delayed allowing for a small amplitude distortion. This method is applicable for relatively low voice frequencies but with presently available techniques the transmission of, for example, TV pictures is not possible due to the high bandwidth requirements for the transmission line. When using this system for voice transmission the pauses can be utilized and a relatively high-speech quality is obtained because for the plurality of speakers one can expect a more or less statistical amplitude distribution, a condition which is normally not fulfilled in transmission of, for example, black and white documents. Thus, for video multiplexing systems the described methods cannot practically by employed or, if employed, employed only with relatively small advantages; i.e., only a low compression factor is obtained.

For transmission of video signals, methods have been developed which are known as run-length methods in which methods code signals defining the distance, for example between two black picture elements, are transmitted. Such a method has been described by C. Cherry et al. in the article "An Experimental Study of the Possible Bandwidth Compression of Visual Image Signals" published in the *Proceedings of the IEEE*, Nov. 1963, pgs. 1507—1517. Run-length methods take advantage of the fact that a printed document only contains about 10 percent black picture elements representing the actual information content. Therefore, transmission of signals representing the white picture elements as such is not necessary. A compression is achieved in that only code signals defining the run-length distance between successively scanned black picture elements are transmitted. A reduction of the required bandwidth is achieved because the code signals are transmitted in intervals distributed equally in time. At the receiver end a time correction is necessary requiring extensive hardware consisting mainly of buffer storage.

In accordance with the present invention the novel arrangement for the transmission of pictures consisting of picture elements of two levels of brightness is based on a multiplexing approach wherein video signal intermissions or pauses in necessary information are utilized. When using this approach a further increase in the number of video channels that can be transmitted over one transmission line is possible if certain properties of the human eye viewing the received pictures are utilized effectively. This latter possibility results in a considerable reduction in the frame repetition frequency of 30 pictures per second used for conventional TV transmission, without essentially deteriorating the quality of the pictures received.

It is therefore an object of the present invention to provide an arrangement for video transmission, which arrangement permits high utilization of the transmission lines used.

It is a further object of the present invention to provide a relatively simple arrangement such that there is no loss of effective time during connection set up, so that switching to a new connection is feasible for each single picture element.

It is yet a further object of the present invention to provide an arrangement for the simultaneous high quality transmission of a plurality of video signals with the incident error rate and noise being so small so as to not seriously affect the quality of the pictures received.

It is still a further object of the present invention to provide an arrangement for approximately obtaining a statistical distribution of the picture element signals to be transmitted by employing a novel scanning arrangement and further for effecting a reduction of the frame repetition frequency without essentially reducing the quality of the picture.

These and other objects and advantages of the present invention are achieved by employing a novel video transmission system wherein a multiplexer, upon receipt of an input signal corresponding to a picture element, produces an address signal defining the receiver station associated with the input channel delivering the signal, and applies the address signal to the transmission line and wherein connection at the receiver station is directly set up by the address signal via logic circuitry. In addition, a priority control circuit serves to select one signal for transmission in case more than one multiplexer input channel receives an input signal simultaneously.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
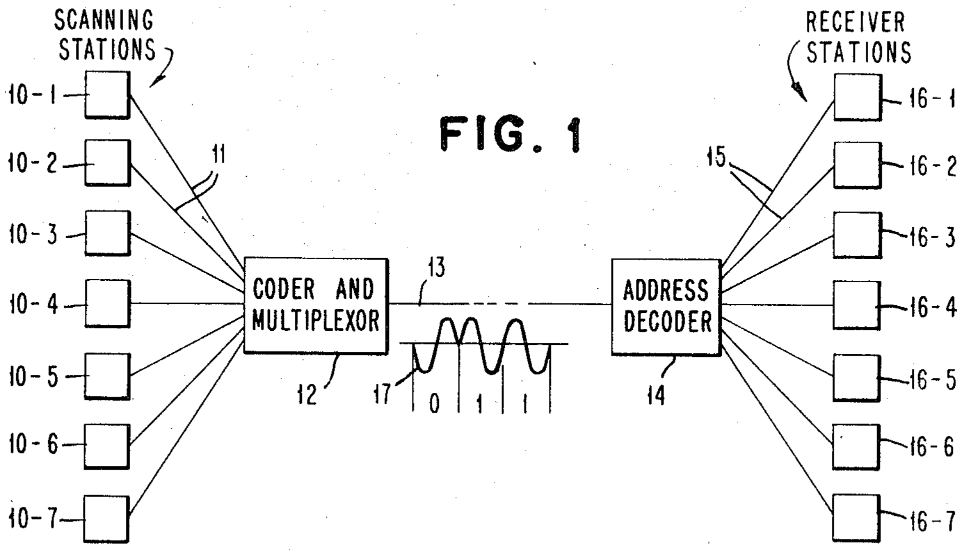
FIG. 1 shows a schematic block diagram of a preferred embodiment of the transmission system in accordance with the present invention.

In FIG. 1 there is shown a block diagram of an information transmission system which can be operated in accordance with the principles of the present invention. This system is primarily suitable for the transmission of pictures of marked contrast in the level of brightness such as, for example, information bearing matter including documents whether printed, handwritten or typed, and also blueprints. One condition important to the operation of the present invention is that the picture to be transmitted consists of picture elements of only two significantly different levels of brightness, as for example, black letters on white paper.

The system shown in FIG. 1 comprises seven scanning stations 10–1 through 10–7 connected via input lines 11 to a coder and multiplexer 12. From there the incoming signals of all scanning stations are transmitted via a transmission line 13, which may, for example, be a cable. However, it is clear that a wireless connection may likewise be used. At the receiver end the signals are applied to address decoder 14 which directs the information to receivers 16–1 through 16–7, via subscriber lines 15. In the more detailed description provided hereinafter a predetermined fixed allocation of each scanning station to only one receiver is assumed for the sake of simplicity. Thus, for example, signals generated by scanner 10–1 are always transmitted to receiver 16–1, those from scanner 10–2 to receiver 16–2, etc. It is evident that when using a system employing more complex exchange circuitry, interchangeable connections are possible. However, the novel features of the present invention can best be described by using a simple system as an example.

Each of the scanning stations 10–1 to 10–7 in FIG. 1 includes a TV camera which, in the simplest system arrangement, scans the picture to be transmitted in the conventional raster scanning method. The scanning stations further include a sampling circuit to which the continuous signals generated by the camera are applied. These signals are sampled with a frequency at least twice as high as the highest frequency contained in the continuous signals. The samples are fed to a threshold detector, and only those samples below a predetermined threshold corresponding to black picture elements are applied, after having been converted into a positive "1" signal to the input line 11 associated with the scanning station. Such scanning station arrangements are well known to those skilled in the art.

The "1" signals sequences from all scanning stations 10–1 through 10–7 in FIG. 1 are coded and applied to a common transmission line 13 via a multiplexer 12, as will be described in detail with reference to FIG. 2. For each "1" signal to be transmitted the binary coded address of the associated receiver station is transmitted instead of the "1" signal itself. The address signals are decoded in the address decoder 14 and conveyed to the corresponding receiver station in form of a single "1" signal. Each of the receiver stations 10–1 through 16–7 includes a conventional TV receiver where a picture corresponding to that at the associated scanning station is formed by the entirety of all "1" signals received during a frame scan. It is essential that all cameras and receivers of the system be operated in synchronism, i.e., all scanning cycles must start at precisely the same time. Any of a variety of well-known synchronization schemes may be employed. For example, a start signal for a frame scan may be provided by a special pulse sequence generated by a clock generator used to control and synchronize the entire transmission system. The common transmission line can be utilized for these synchronization pulses. Exact synchronization during a frame scan may be obtained by choosing a suitable signal code. The code scheme illustrated in FIG. 1 by the signal sequence designated 17 may, for example, be used. In this example both "0" and "1" signals are transmitted in the form of one sinusoidal wave, the signals being distinguished only by their phase. The coding and multiplexing principles used in the novel transmission system of the present invention will be explained with reference to FIG. 2 where the transmission system already shown in FIG. 1 is again used as an example. It should be noted that for the sake of clarity the same designations for corresponding circuits and elements are used in all figures of the present specification.

Figure 2:
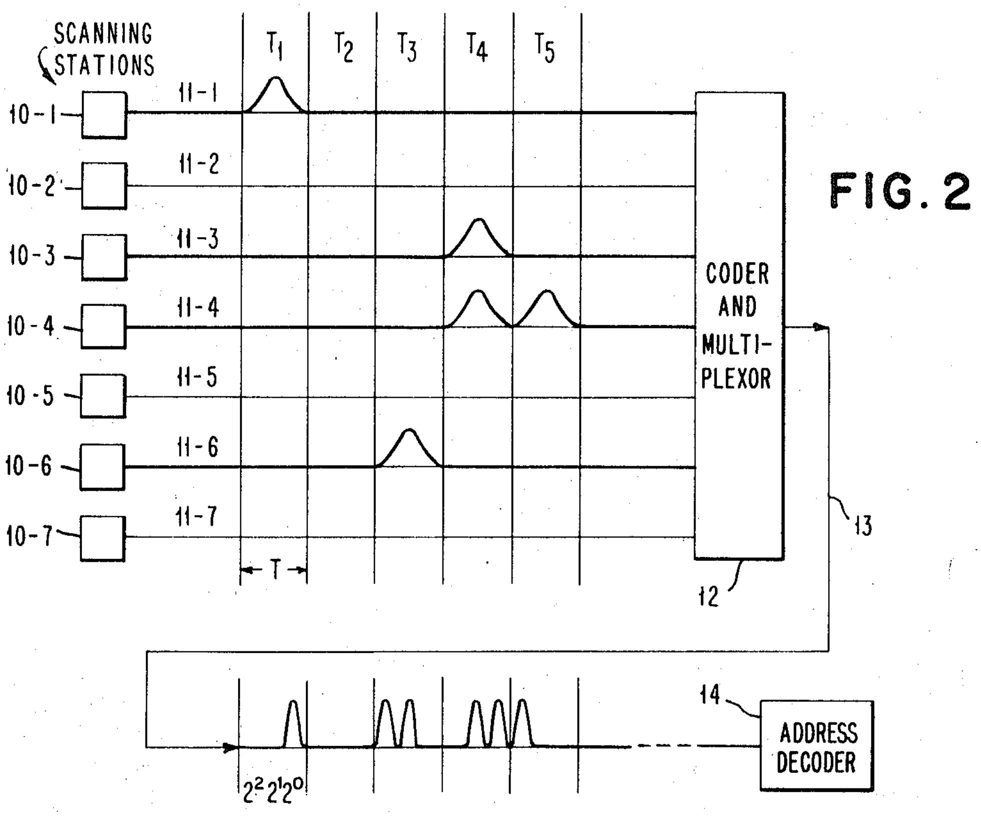
FIG. 2 shows a schematic representation of an example of the timing relationship of the various scanning stations operating in accordance with the present invention.

In FIG. 2 there is shown an example of the time relationship of output signals from the scanning stations, which are again designated 10–1 through 10–7, respectively. The output signals from scanning stations 10–1 through 10–7 are fed to input lines 11–1 through 11–7, respectively. In the gridlike representation in FIG. 2, for each of the input lines 11–1 through 11–7, "1" signal sequences are shown which are assumed to occur in five subsequent scanning intervals $T_1$ through $T_5$. Each time interval T corresponds to one scanning interval. The signals are applied in parallel to the coder and multiplexer 12. Its mode of operation is to be described with the aid of the assumed signal sequences. During each time interval T all input lines are scanned under the control of pulses provided by the clock generator synchronizing the system. When a "1" signal is detected on one of these lines, this signal is converted into a binary coded address signal and applied to transmission line 13. Only one address signal can be transmitted during each time interval T. Thus, in principle, three different cases may occur:

1. No "1" signal on any one of the input lines 11. In this case, the binary signal 000 is transmitted which is not considered to be an address but an indication that no "1" signal is present.

2. A "1" signal is present on only one of the input lines, e.g., line 11–5. The binary coded address of the corresponding receiver station (in the described embodiment scanning station and associated receiver station have the same number) is formed and transmitted via transmission line 13. For example, the binary address of station 16–5 (FIG. 1) may be 101.
3. "1" signals are present on more than one of the input lines 11. In this case, only one of the incoming "1" signals is transmitted over transmission line 13 after having formed the receiver address. The other simultaneously occurring "1" signals are suppressed, as will be explained in more detail hereinafter.

In the lower part of FIG. 2 the address signals formed in circuitry 12 in accordance with the "1" signals occurring during time intervals $T_1$ through $T_5$ and transmitted on transmission line 13 are schematically shown. It should be noted that the signals indicated in FIG. 2 correspond to the simple binary address code. However, it should be recognized that for synchronization purposes a different transmission code may be required, as for example, a code as represented by signal 17 in FIG. 1.

From FIG. 2 it becomes apparent that for video signals scanned and sampled during time intervals $T_1$, $T_2$, $T_3$ and $T_5$ a nondistorted transmission is provided, whereas out of the two "1" signals derived from scanning stations 10–3 and 10–4 during time interval $T_4$ only one signal is transmitted. In the case as assumed in FIG. 2, the signal from scanning station 10–3 is transmitted whereas the signal stemming from station 10–4 is suppressed. This results in an error in the picture formed in receiver station 16–4, i.e., the resulting picture element corresponding to time interval $T_4$ is white instead of black. With the aid of FIGS. 3 and 4, the circuitry and operation of the coder and multiplexer 12 in FIGS. 1 and 2 will now be described in more detail, and the required selection of a "1" signal for transmittal in accordance with a priority scheme, which is necessary in case 3 above, will be explained.

Figure 3:
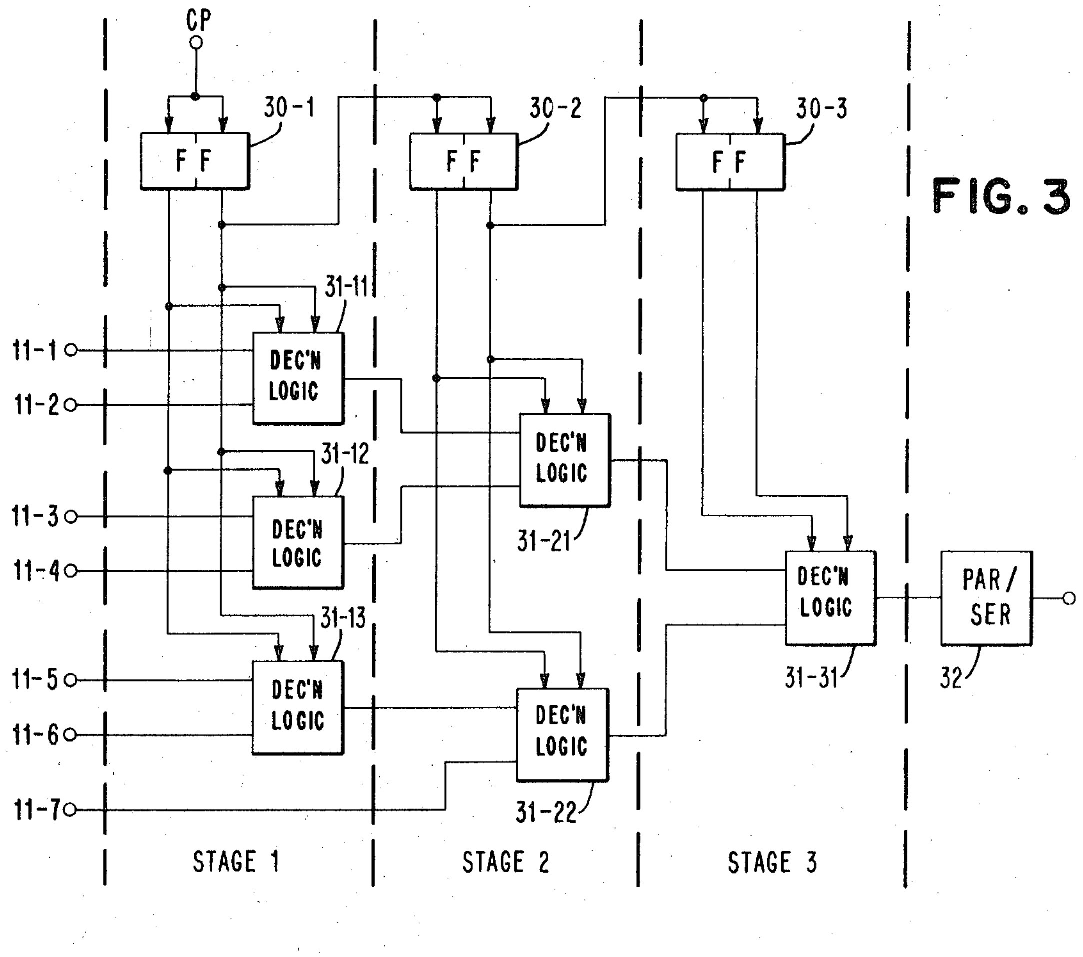
FIG. 3 shows a block diagram of the coder and multiplexer shown in FIG. 1.

FIG. 3 shows the block diagram of the coder and multiplexer designated 12 in FIG. 1, which comprises seven input lines 11–1 through 11–7 leading to the seven scanning stations 10–1 through 10–7. At each of the logic circuits 31–11, 31–12 and 31–13 of stage 1 two input lines are logically combined. Under the control of complementary flip-flop circuit 30–1, switched by clock pulses applied to input CP, these logic circuits provide a "1" signal as well as the binary coded address of a scanning station delivering the "1" signal provided a "1" signal occurs on at least one of the input terminals associated with the logic circuit. When each input connected to a particular logic circuit carries a "1" signal, flip-flop 30–1 determines which one of the two signals is to be transmitted. Circuit 31–11, for example, provides an output signal to the second stage when inputs 11–1 and/or 11–2 carry a "1" signal with flip-flop 30–1 determining which of the two inputs will be transmitted when both are present. The same applies to circuit 31–12 and inputs 11–3 and 11–4, and for circuit 31–13 and inputs 11–5 and 11–6. Input 11–7, however, is directly connected to logic circuit 31–22 in stage 2. The described system comprises seven scanning stations, wherein seven different addresses have to be formed and transmitted. This is possible with the binary numbers 001 through 111, i.e., with three bit positions. The eighth binary number which can be formed with three-bit positions is 000 and this number is utilized to indicate the "0" signal condition on the common transmission line.

In stage 2 the same logic operations are performed in logic circuits 31–21 and 31–22. Circuit 31–21 produces an address signal when circuit 31–11 and/or circuit 31–12 provides an output signal. Correspondingly, the same function applies to circuit 31–22 with respect to logic circuit 31–13 and input 11–7. Flip-flop circuit 30–2 serves to select, if necessary, one of several simultaneously appearing signals in a fashion similar to flip-flop 30–1 in stage 1. If, for example, circuits 31–11 and 31–12 both provide a "1" signal during a time interval T, one of the signals is suppressed in circuit 31–21. Stage 3 again performs the same basic logic operation as stages 1 and 2 with circuit 31–31 providing a three-bit binary address when a "1" signal appears on either of its inputs, the address produced in parallel and corresponding to the address of the input 11–1 through 11–7 having a "1" signal. Because this three-bit address occurs simultaneously in parallel and line 13 can carry only one signal at a time, a code conversion of parallel to series is performed by circuit 32, which may be any of a variety of parallel-to-series conversion circuits well known in the art.

Figure 4:
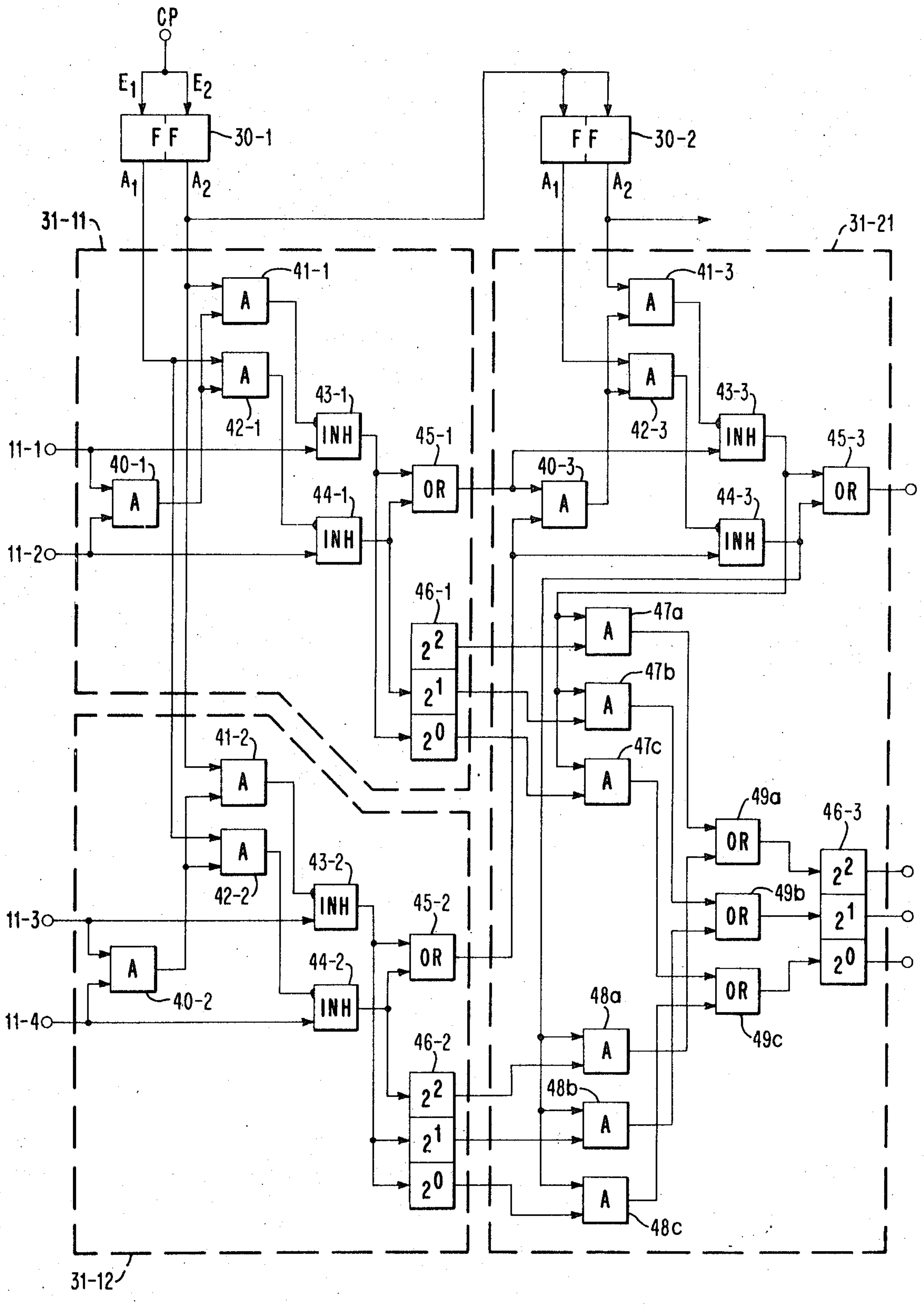
FIG. 4 shows a more detailed circuit diagram of the coder and multiplexer shown in FIG. 3.

In FIG. 4 there is shown an exemplary detail of the logic circuits 31–11, 31–12 and 31–21 shown in FIG. 3. Logic circuit 31–11, surrounded by a dashed line, comprises AND-gates 40–1, 41–1 and 42–1 and two inhibit circuits 43–1 and 44–1 which inhibit circuits perform the function $y = \bar{x}_1 x_2$ with the subscripts corresponding, respectively, to the inhibit input and the noninhibit input of each of the inhibit circuits. OR-gate 45–1 serves to couple the logical output of circuit 31–11 to the input of circuit 31–21. As can be seen in FIG. 4, register 46–1 consists of three binary stages. Its purpose is to form and store the binary coded address of either scanning station 10–1 connected to input 11–1 or scanning station 10–2 connected to input 11–2. The following operation of the logic circuitry shown in FIG. 4 is described for the various possible input signal conditions on outputs 11–1 and 11–2 wherein a "1" signal corresponds to a positive potential and a "0" signal corresponds to a zero potential.

Condition 1:

Input 11–1 = 0, Input 11–2 = 0.

The $x_2$ inputs of both circuits 43–1 and 44–1 and, therefore, the outputs of these circuits are on zero potential. Also the output of OR-gate 45–1 remains on zero potential and the address register 46–1, which has been reset by a clock pulse at the beginning of the timer interval X under consideration, remains unchanged.

Condition 2:

Input 11–1 = 1, Input 11–2 = 0.

Because positive potential is supplied to only one input of AND-gate 40–1, this circuit as well as AND-gates 41–1 and 42–1 remain closed. At the input of inhibit circuit 43–1 the potentials $x_1 = 0$ and $x_2 = 1$ occur and this circuit provides a positive output signal. Circuit 44–1 gives no output signal because its input $x_2$ is zero potential. A positive signal appears at the output of OR-gate 45–1, and state $2^0$ of register 46–1 is switched whereby the value 001 stored in the register corresponds to the address of input 11–1.

Condition 3:

Input 11–1 = 0, Input 11–2 = 1.

In a manner corresponding to the previously described situation of condition 2, a positive signal appears at the output of circuit 44–1 whereas the output of circuit 43–1 remains on zero potential. The output of OR-gate 45–1 turns again positive, and stage $2^1$ of register 46–1 is switched. The register thereby contains the binary address 010 of input 11–2.

Condition 4:

Input 11–1 = 1, Input 11–2 = 1.

Because both inputs of AND-gate 40–1 are positive, this circuit provides a positive output signal which is applied to one of the inputs of both AND-gates 41–1 and 42–1. Depending on the condition of flip-flop circuit 30–1, i.e., depending on whether its output $A_1$ or $A_2$ is positive, one of the AND-gates 42–1 or 41–1 will receive two positive input signals and will be "ANDed". The positive output signal of that AND gate receiving two positive inputs inhibits the operation of its corresponding inhibit circuit, either circuit 43–1 or 44–1. Where the flip-flop 30–1 output $A_1$ provides positive potential, circuit 44–1 remains closed and circuit 43–1 gives a positive output signal passing through OR-gate 45–1 and storing the binary address 001 of input 11–1 in register 46–1. However, where output $A_2$ of flip-flop 30–1 is positive, then address 010 of input 11–2 is stored.

When two positive "1" signals appear simultaneously on both inputs 11–1 and 11–2, the necessary selection of the signal to be transmitted is performed by flip-flop circuit 30–1.

In the system described flip-flop 30–1 is switched in response to each of the clock pulses as they control the scanning intervals. The clock pulses are applied to both inputs of flip-flop 30–1 causing complementary switching of this flip-flop with each pulse. Complementary flip-flop circuit 30–2, controlling stage 2, is switched only by each second clock pulse CP, i.e., each time output $A_2$ of flip-flop 30–1 becomes positive. With this arrangement priority is assigned alternately to the input lines resulting in an improved picture quality at the receiver. If, for instance, in an unfavorable case both scanning stations 10–1 and 10–2 horizontally scan two black lines simultaneously, both of which have a length corresponding to six time intervals, then the signal sequence at both inputs 11–1 and 11–2 is six successive "1" signals. With a fixed priority assignment, one of the receivers, for example 16–1, would receive an undistorted signal sequence of six successive "1" signals whereas the other receiver, for example 16–2, would receive a signal sequence of six successive "0" signals and here the line would be missing. With alternately assigned priorities in accordance with the present invention the signal sequences 101010 and 010101, respectively, are transmitted to the receivers thereby providing an improved picture quality.

The following Table 1 illustrates the control operation of flip-flop circuits 30–1 and 30–2, the latter one being switched with half the frequency of the other. As an example, the unfavorable case is chosen where all inputs 1 through 4 receive continuously "1" signals during four successive time intervals $T_1$ through $T_4$. In the Table, these "1" signals are identified with the corresponding input number.

TABLE 1

| | Time Intervals | | | |
|---|---|---|---|---|
| | $T_1$ | $T_2$ | $T_3$ | $T_4$ |
| Flip-flop output with positive potential: | | | | |
| 30–1 | $A_1$ | $A_2$ | $A_1$ | $A_2$ |
| 30–2 | $A_1$ | $A_1$ | $A_2$ | $A_2$ |
| "1" input signals at inputs: | | | | |
| 11–1 | 11–1 | 11–1 | 11–1 | 11–1 |
| 11–2 | 11–2 | 11–2 | 11–2 | 11–2 |
| 11–3 | 11–3 | 11–3 | 11–3 | 11–3 |
| 11–4 | 11–4 | 11–4 | 11–4 | 11–4 |
| Output signal of stage 1: | | | | |
| 31–11 | 11–1 | 11–2 | 11–1 | 11–2 |
| 31–12 | 11–3 | 11–4 | 11–3 | 11–4 |
| Output signal of stage 2: | | | | |
| 31–21 | 11–1 | 11–2 | 11–3 | 11–4 |

In the last three lines of Table 1 the various designations are used to denote from which input line the signal originated. From the last line of the Table it becomes apparent that, with the flip-flop controlled priority assignment arrangement explained above, during the four time intervals under consideration one "1" signal from each of the input lines 11–1, 11–2, 11–3 and 11–4 is transmitted.

Thus far, the operation of the system of the present invention has been described and considered with reference to a single frame scan and a single picture reproduction at the receiver. For nonmoving pictures, however, a frequent repetition is possible and a considerable improvement in quality can be achieved when, for example during a second frame scan, priority in corresponding time intervals is assigned to different inputs than during the first frame scan. In the system described this can be accomplished by varying the initial condition of the flip-flop circuits 30–1 at the beginning of each frame scan. If an uneven total number of time intervals is required for complete scanning of a picture this occurs automatically. However, if the number of time intervals is even the change in priority assignment can be accomplished by applying an additional clock pulse to flip-flop 30–1. In the hereinabove described case where two horizontal lines are scanned by stations 10–1 and 10–2 and the corresponding "1" signal sequences are applied to inputs 11–1 and 11–2, the signal sequences 101010 and 010101 are transmitted to receiver 16–1 during successive frame scans whereas, alternatively, the reversed sequence is obtained at receiver 16–2. By superimposing these signal sequences at the receiver a picture of good quality is obtained for the viewing human eye.

For systems with extreme high quality requirements a further improvement can be achieved by changing the described operation of flip-flop circuits 30–1 and 30–2 so that priority is assigned to the inputs 11–1 through 11–7 in a pseudorandom sequence. This can be accomplished by so-called pseudorandom pulse sequences which are used either to switch flip-flop 30–1 or to directly control the circuits determining the priority, as for example AND-gates 41–1 and 42–1. The generation of such pulse sequences has been adequately described by F. Golomb in his book entitled "Digital Communications," *Prentice-Hall Inc.* and will not be explained in detail here.

With reference to FIG. 4 the operation of the logic circuit 31–11 has been described wherein the circuit provides, in accordance with the signals appearing at inputs 11–1 and 11–2, both an output signal for subsequent circuits at the output of OR-gate 45–1 as well as the stored address of the input to which the "1" signal is applied. Logic circuits 31–12 and 31–21, also surrounded by a dashed line, perform these same functions. Circuit 31–12 performs the functions for inputs 11–3 and 11–4, whereas circuit 31–21 performs the functions for the output signals of OR-gates 45–1 and 45–2. OR gate 45–3 provides a positive output signal when a positive "1" signal occurs at any one of inputs 11–1, 11–2, 11–3 or 11–4. Circuit 31–21 also contains an address register 46–3 for storing the address of that input whose "1" signal is to be conveyed to the receiver having a corresponding address. This address is stored in register 46–3 by transferring thereto one of the addresses contained in registers 46–1 or 46–2. Either the set of AND-gates 47*a*, 47*b* and 47*c* or the set of AND-gates 48*a*, 48*b* and 48*c*, along with OR-gates 49*a*, 49*b* and 49*c* effect this transfer. As can be seen in FIG. 4 the control pulses required for these latter sets of AND gates are derived from the outputs of the respective inhibit circuits 43–3 and 44–3. Depending on whether the signal to be transmitted occurs at input pair 11–1 and 11–2 or at input pair 11–3 and 11–4, the output signal of either inhibit circuit 43–3 or inhibit circuit 44–3 is positive. The positive signal of either circuit 43–3 or circuit 44–3 conditions the respective set of AND-gates 47*a*, 47*b* and 47*c*, or 48*a*, 48*b* and 48*c* for transmission of the binary "1" signals from the respective registers 46–1 or 46–2 into the corresponding stages of register 46–3.

The output of OR-gate 45–3, and the outputs of the stages of register 46 –3 in FIG. 4 are connected to the inputs of logic circuit 31–31 of stage 3 of the coder and multiplexer of FIG. 3. In stage 3 these latter outputs are logically combined with the outputs of the circuit arrangement comprising logic circuits 31–13 and 31–22, which arrangement is practically identical to the one shown in FIG. 4 and which combines inputs 11–5, 11–6 and 11–7. The logic circuitry and function of stage 3 are identical to that of logic circuit 31–21 and provide the required address signal to be applied to transmission line 13 after conversion into a serial code.

Figure 5:
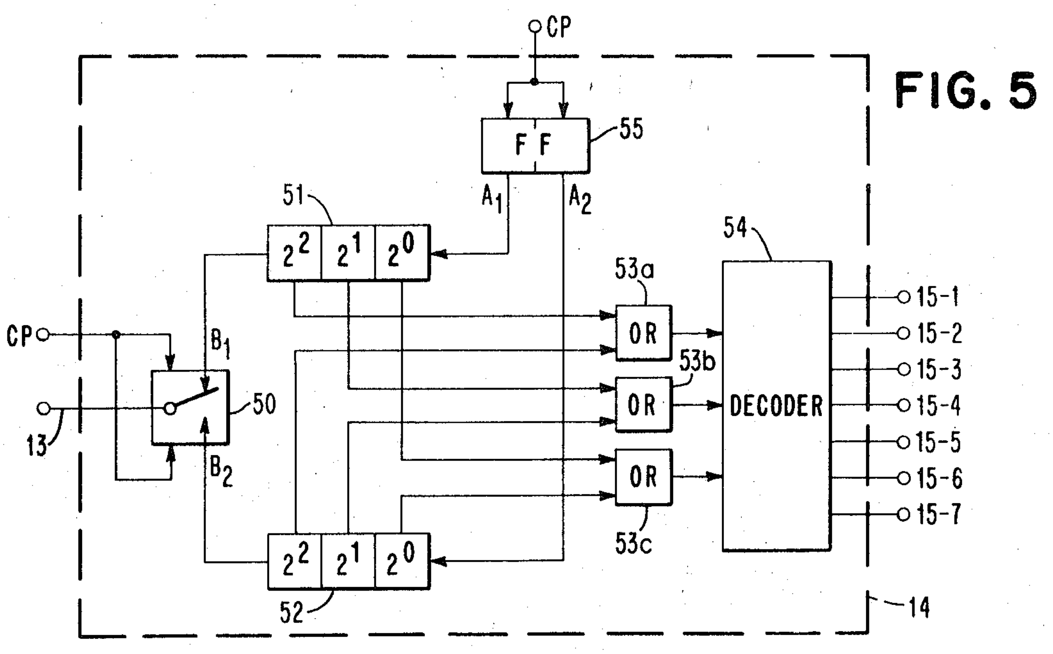
FIG. 5 shows a circuit diagram of the address decoder shown in FIG. 1.

FIG. 5 shows a schematic circuit diagram of the address decoder designated 14 in FIG. 1. During the various time intervals this circuitry receives from the common transmission line 13 the binary coded address of that receiver to which a "1" signal is to be transmitted. The described transmission system contains seven scanning stations and, correspondingly, seven receiver stations which receiver stations are respectively connected to output lines 15–1 through 15–7, shown in FIG. 5. For each three bit address signal received from line 13 during a time interval T, circuit 14 of FIG. 5 has to provide a "1" signal to that output line 14 connected to the receiver station corresponding to the address.

In FIG. 5 block 50 represents an electronic switch which, under the control of clock pulses CP, directs incoming signals either via its output $B_1$ to a register 51 or via its output $B_2$ to register 52. Both registers are three stage shift registers into which the three-bit address can be stored during each time interval T. The register stages 51 and 52 are connected, via OR-gates 53a, 53b and 53c, to the inputs of the decoder circuit 54 which circuit provides an output signal to that output line corresponding to the binary coded address. Flip-flop circuit 55 is switched by clock pulses CP. Each time flip-flop circuit 55 is switched it provides a control signal at one of its outputs $A_1$ or $A_2$ which signal is accordingly used to reset one of the corresponding registers 51 or 52, respectively, to zero. When either one of the register stages 51 or 52 is reset from an address condition to zero, it sends the address to associated OR-gate 53. If a register stage is already in the zero position when the reset pulse arrives, no output pulse is generated.

It is now assumed that at the beginning of a time interval T switch 50 is brought into position $B_1$ and subsequently arriving address pulses, for example 101, are stored in register 51. The next following clock pulse brings switch 50 into position $B_2$. At the same time flip-flop 55 is brought into the $A_1$ position wherein a control pulse appears at its output $A_1$. This control pulse resets stages 1 and 3 of register 51 while these stages in turn provide input pulses to OR-gates 53a and 53c. These input pulses pass through the OR gates and are decoded in decoder 54 which in turn delivers an output signal to output line 15–5 leading to receiver 16–5. Simultaneously with the resetting of register 51 and the decoding operation, the next three address bits are stored in register 52. The next clock pulse brings switch 50 again into position $B_1$ and flip-flop 55 into the $A_2$ condition such that there is a control pulse appearing at output $A_2$ to initiate the transfer of the second address stored in register 52 to decoder 54. These operations are repeated, under control of clock pulses CP, as long as the transmission is continued.

The principles of the present invention by which information compression is achieved thereby allowing for a more efficient utilization of the bandwidth of transmission lines are based on the knowledge that it is sufficient for transmission of black and white pictures to transmit only the black picture elements omitting the white ones. For the transmission of documents which may be printed or typewritten, a rather high compression factor may be achieved because the percentage of black picture elements is generally quite small. Assuming that on such a document only about $1/k = 10$ percent of the whole document is black, the compression factor which may be obtained with the described arrangement can be calculated from the following formula:

$$c = k-1/ldk \qquad (1)$$

wherein $ldk$ = logarithmus dualis of factor $k$.

The value indicated in the numerator is k-1 because, as already mentioned, address 000 is not used. As the binary coded address of the receiver station is to be transmitted for each black picture element this numerator is to be divided by the number of bits required for address transmittal, i.e. it has to be divided by $ldk$. For $k = 8$ the compression factor $c_8$ is derived from equation (1).

$$c_8 = 7/3 = 2\tfrac{1}{3}$$

A completely faultless transmission is possible only when of the seven picture elements of the simultaneously scanned documents only one element is black within each time interval. Otherwise, errors will occur due to the fact that during each time interval T only one "1" signal can be transmitted. It may happen that the written lines of all documents are more or less in the same position at all scanning stations in which event an accumulation of black picture elements may result. If the conventional raster scan method is used a relatively high error rate may be expected. However, a large improvement in the transmission quality is possible when the conventional linewise scanning method is replaced by the so-called pseudorandom scanning method. Under such an arrangement a better time distribution of the "1" signals corresponding to black picture elements is provided. Such a scanning arrangement is, for example, described in U.S. Pat. No. 3,309,461. Accordingly, only a brief description will be provided herein.

Figures 6A, 6B:
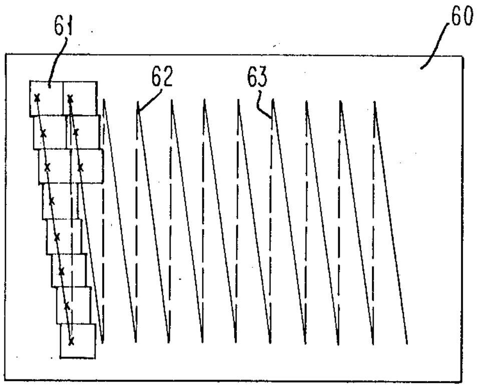
FIG. 6*a* shows a schematic representation of a pseudorandom scanning method in accordance with the present invention.
FIG. 6*b* shows a representation of the sequence in which the picture elements can be scanned when using the pseudorandom scanning method illustrated in FIG. 6*a*.

It can be seen with reference to FIG. 6a that when using a pseudorandom scanning method the total picture 60 is divided into a plurality of small rectangles or squares 61 and the latter may, for example, consist of 8×8 picture elements. FIG. 6b shows how such a square 61 may be arranged into 64 picture elements 64. During a frame scan, for example, all elements 1 of all squares of the whole picture are first scanned, one after the other. In FIG. 6a this is indicated by line 62 illustrating the scanning movement of the electron beam and by line 63 representing the retrace. Afterwards, all points 2 are scanned, then points 3, and so on. In order to reduce the very high electron beam speed required for this scanning method, the system may, for example, be arranged such that elements 1 through 5 are first scanned in one square, then corresponding elements in the second square and so on.

When each document to be transmitted is scanned in a different pseudorandom sequence or in the same sequence displaced against each other in time, a nearly statistical distribution of the scanned black picture elements, and the corresponding "1" signals to be transmitted, can be achieved. Such an arrangement approaches an ideal distribution whereby during each scanning interval the scanned picture element of only one of the seven documents is black. It is evident in this regard that whatever the sequence movement of the scanning beam at a scanning station there must be synchronous like movement at the corresponding receiver station.

In the case of pseudorandom scanning the error probability can approximately be determined by the following equation, $$p(n) = (m/n)\,(1/k)^n\,(1-1/k)^{m-n} \qquad (2)$$

where $p(n)$ = probability of $n$ black elements occurring out of $m$ simultaneously scanned picture elements;

$m$ = number of simultaneously scanned picture elements;

$n$ = number of black picture elements;

$1/k$ = average percentage of black picture elements of all scanned documents.

For $m = 7$ and $k = 8$, the values listed in the following Table 2 may be derived from equation (2).

TABLE 2

| Number of black elements when scanning simultaneously 7 documents | Probability (%) | Number of scanning intervals causing an error (%) |
|---|---|---|
| 0 | 39.3 | 0 |
| 1 | 39.3 | 0 |
| 2 | 16.8 | 16.8 |
| 3 | 4.0 | 4.0 |
| >3 | 0.6 | 0.6 |
| | 100.0 | 21.4 |

From the percentage of scanning intervals causing an error (21.4 percent) the percentage of black picture elements suppressed is determined to be 30.5 percent. Thus, an average of every third black picture element is missing at the receiver. This is the error rate for a single-frame scan. As has already been explained, improved picture quality can be obtained when the nonmoving documents are scanned several times and the priority assignment for the "1" signals to be transmitted is varied from scan to scan whereby the missing black picture elements are placed at different spots.

With pseudorandom scanning a yet further advantage can be achieved wherein a considerable improvement in the total compression factor may be obtained. In conventional TV systems utilizing linewise scanning, about 30 frame scans per second are required for a clear and steady picture. In accordance with the present invention, however, experiments have shown that by employing pseudorandom scanning a reduction of the frame scan frequency by the factor $c_p = 8$ is possible without essentially influencing the picture quality. S. Deutsch in his article entitled "PseudoRandom Dot Scan Television Systems" in the *IEEE Transactions on Broadcasting*, July 1965, page 11, suggests that a reduction in the frame scan frequency by a factor of 16 may even be possible.

When employing the pseudorandom scanning method the total compression factor obtainable is defined by the following equation:

$$c_t = c_s c_p = k-1/ldk\, c_p \qquad (3)$$

with $k=8$ and $c_p=8$ the resulting total compression factor is $c_t = 18\ 2/3$.

The features, advantages and savings which are obtained with the arrangements of the present invention may best be illustrated by way of an example. Conventional TV transmission channels require a bandwidth of about 4 mc. This corresponds to a picture of 525 lines. For the transmission of written documents this resolution, however, is not sufficient since suitable systems require a bandwidth of about 30 mc. It is known that for a good reproduction quality the sampling frequency must be at least twice as high as the maximum frequency contained in the video signal. For the high resolution required for document transmission in conventional TV systems this results in a bit rate of at least 60 M Bit/*s*. In a system where seven documents are scanned simultaneously as provided in accordance with the principles of the present invention, resulting total bit rate is, $$\frac{60\times 7}{c_t}=\frac{60\times 7}{18\ ^2/_3}=22.5\ \text{M Bit/s}$$

It is clear that if two systems are combined with seven scanning stations each, 2×3=6 address bits are to be transmitted during each sampling cycle. In a Pulse Amplitude Modulation (PAM) transmission arrangement providing transmission of 64 different amplitude levels, which corresponds to an information content of six bits, the resulting reduction in the required bandwidth is 22.5/6 = 3.75 mc. This value corresponds to the bandwidth of conventional TV transmission channels. Accordingly, it can be seen that 14 black and white TV connections, each of which would normally require 30 mc. bandwidth, can be handled by a transmission line of 3.75 mc. bandwidth.

Although the described method may preferably be employed for transmission of pictures consisting of elements assuming only two different levels of brightness, in principle application in systems for transmission of pictures with a plurality of brightness levels or grey-levels is likewise possible. In such systems only those signals stemming from picture elements having a defined grey-level are transmitted during one frame scan, with the required number of frame scans corresponding to the number of grey-levels to be distinguished.

Although the invention has been described with the aid of a specific video-transmission system in which the inventive concepts may be employed, it is clear that the invention may also find application in systems in which, for example, picture scanning and priority assignment arrangements are different.

What is claimed is:

1. A system for the simultaneous transmission of pictures between a plurality of scanning stations and receiver stations, said pictures comprising elements of at least two levels of brightness with said scanning stations simultaneously scanning said pictures to produce video signals indicative of said at least two levels of brightness corresponding to the information content thereof, comprising:

multiplexing means synchronously coupled to each of said plurality of scanning stations for receiving as they are presented at each station within time divided intervals during each frame scan of said pictures information signals indicative of one of said at least two levels of brightness of said pictures for producing address signals corresponding to the addresses of the respective scanning stations providing said information signals, said multiplexing means including priority control circuit means for selecting an information signal from one of said scanning stations when more than one of said scanning stations simultaneously presents an information signal to said multiplexing means; and, transmission and decoder means coupled between said multiplexing means and said plurality of receiver stations for transmitting and decoding said address signals to provide the respective said receiver stations with video signals in accordance with said address signals.

2. The system as set forth in claim 1 wherein said scanning stations scan said picture elements in pseudorandom sequence and wherein picture reconstructing scanning means in said receiver stations synchronously follow the same pseudorandom sequence.

3. The system as set forth in claim 2 wherein each scanning station of said plurality of scanning stations scans in a different pseudorandom sequence and wherein the said reconstructing scanning means of each of said receiver stations follows the same sequence as that of its corresponding scanning station.

4. The system as set forth in claim 2 wherein each of said scanning stations scans in the same scanning sequence with the scanning sequences displaced with respect to one another in time.

5. A system for simultaneous transmission of pictures between a plurality of scanning stations and receiver stations, said pictures comprising elements of two levels of brightness with said scanning stations simultaneously scanning said pictures to produce video signals corresponding to the information content thereof, comprising:

multiplexing means coupled to said plurality of scanning stations for receiving said video signals therefrom and producing address signals corresponding to the addresses of the respective scanning stations providing said video signals, said multiplexing means including priority control circuit means for selecting a video signal from one of said scanning stations when more than one of said scanning stations simultaneously provides a video signal to said multiplexing means, the priority of selection as between the simultaneously provided video signals from the said more than one scanning stations of said priority control circuit means changing with each frame of scanning in the scanning stations; and, transmission and decoder means coupled between said multiplexing means and said plurality of receiver stations for transmitting and decoding said address signals to provide the respective said receiver stations with video signals in accordance with said address signals.

6. The system as set forth in claim 5 wherein the priority of selection as between the said more than one scanning stations of said priority control circuit means change in a pseudorandom sequence with each frame of scanning in the scanning stations.

7. The system as set forth in claim 1 wherein said transmission means comprises a conventional television transmission channel.

8. A system for the simultaneous transmission of pictures between a plurality of scanning stations and a plurality of corresponding receiver stations, said pictures comprising elements of two levels of brightness and each of said scanning stations including means to scan said pictures to produce for each frame scan signals indicative of the information content therein of one of said levels of brightness comprising:

multiplexing means synchronously coupled to each of said scanning stations for receiving during fixed time increments said signals from said scanning stations as they are provided by said stations and producing address signals corresponding to the address of the respective scanning station providing the signal, said multiplexing means including priority control circuit means for selecting a signal from one of said scanning stations when more than one of said scanning stations simultaneously provides a signal to said multiplexing means;

transmission means coupled to said multiplexing means for transmitting said address signals produced by said multiplexing means; and decoder means coupled between said transmission means and said plurality of receiver stations for decoding said address signals and providing signals to the respective receiver stations having an address corresponding to the address decoded from said address signals.

9. The system scanning and receiving stations as set forth in claim 8 wherein clock pulse means act to synchronize said system.

10. A system for simultaneously transmitting a plurality of blocks of indicia with said indicia having a different level of brightness than the corresponding background therefor comprising:

a plurality of scanning stations each having scanning means operating in synchronism with one another and with at least one of each of said scanning means scanning a different one of said plurality of blocks of indicia, each of said scanning means scanning its associated block of indicia so as to produce an information signal at substantially random intervals in response to the different level of brightness of said indicia;

multiplexing and encoding means operating in synchronism with each of said scanning means for receiving during time divided intervals the information signal provided by any of said scanning stations and producing an address signal corresponding to the address of the scanning station providing the information signal, said multiplexing and encoding means including priority circuit means for selecting a signal from one of said scanning stations when more than one of said scanning stations simultaneously provides a signal to said multiplexing and encoding means;

transmission means coupled to the output of said multiplexing and encoding means for transmitting said address signal;

decoding and plural receiving station means operating in synchronism with said multiplexing and encoding means for decoding said address signal and providing an information signal directly to the receiving station of said plural receiving station means having an address corresponding to the decoded address whereby a succession of said information signals to the respective receiving stations produces at each receiving station the blocks of indicia scanned at the scanning station corresponding thereto.

11. The system as set forth in claim 10 wherein said substantially random intervals are produced by scanning said scanning means across said indicia in a pseudorandom sequence.

12. The system as set forth in claim 11 wherein each of said scanning means scans in a different pseudorandom sequence.

13. The system as set forth in claim 12 wherein said multiplexing and encoding means includes priority selection means for selecting the information signal from one of said scanning stations when more than one of said scanning stations provides an information signal thereto during a single of said intervals.

14. A system for simultaneously transmitting a plurality of groupings of visual information having elements of two levels of brightness comprising:

a plurality of scanning stations, with at least one of each of said scanning stations scanning a corresponding respective one of said plurality of groupings of visual information in a different pseudorandom sequence than the others to thereby provide at the outputs thereof information signals indicative of the elements of one of said two levels of brightness in its respective one of said plurality of groupings of visual information;

multiplexing and encoding means coupled to said outputs for receiving said information signals and producing address signals corresponding to the address of the scanning station providing the information signal, said multiplexing and encoding means including priority selection means for selecting one of a plurality of information signals simultaneously received from a corresponding plurality of scanning stations with the priority of said priority selection means varying over successive instances of said information signals being simultaneously received;

transmission means coupled to said multiplexing and encoding means for transmitting said address signals; and decoder and plural receiver stations coupled to said transmission means for decoding said address signals and providing an information signal to the corresponding one of said plural receiver station means having an address corresponding to the address of the decoded address, each of said plural receiver station means operating in the same pseudorandom sequence as its corresponding scanning station.

15. A system for simultaneously transmitting a plurality of blocks of visual information, the visual information of each block characterized by two levels of brightness comprising:

a plurality of scanning stations with at least one of each of said plurality of scanning stations associated with a different one of said plurality of blocks of information, each of said scanning stations scanning simultaneously its associated block of information to produce an information signal corresponding to the information content of one of the two levels of brightness of its associated block of information;

multiplexing and encoding means coupled to each of said scanning stations for accepting from any one of the said scanning stations per increment of time the said information signal therefrom and producing address signals corresponding to the address of the scanning station providing the said information signal, said multiplexing and encoding means including logical priority selection means for selecting the information signal from one of said scanning stations when more than one scanning station presents an information signal per increment of time, said logical priority selection means varying in priority over successive instances of more than one scanning station presenting an information signal per increment of time;

transmission means coupled to the output of said multiplexing and encoding means for transmitting said address signals; and decoding and plural receiver station means for decoding said address signals and providing an information signal to the one of said plural receiver station means having an address corresponding to the decoded address.

16. A system for simultaneously transmitting a plurality of blocks of indicia with said indicia having a different level of brightness than the corresponding background therefor comprising:

a plurality of scanning stations each having scanning means operating in synchronism with one another and with at least one of each of said scanning means scanning a different one of said plurality of blocks of indicia, each of said scanning means scanning its associated block of indicia so as to produce an information signal at substantially random intervals in response to the different level of brightness of said indicia, said substantially random intervals being produced by scanning each of said scanning means across said indicia in a different pseudorandom sequence;

multiplexing and encoding means operating in synchronism with each of said scanning means for receiving during time divided intervals an information signal from any one of said scanning stations and producing an address signal corresponding to the address of the scanning station providing the information signal, said multiplexing and encoding means including priority selection means for selecting the information signal from one of said scanning stations when more than one of said scanning stations provides an information signal thereto during a single of said intervals, the priority of said priority selection means varying in a pseudorandom sequence over successive ones of said single intervals;

transmission means coupled to the output of said multiplexing and encoding means for transmitting said address signal;

decoding and plural receiving station means operating in synchronism with said multiplexing and encoding means for decoding said address signal and providing an information signal directly to the receiving station of said plural receiving station means having an address corresponding to the decoded address whereby a succession of said information signals to the respective receiving stations produces at each receiving station the blocks of indicia scanned at the scanning station corresponding thereto.

17. The system as set forth in claim 16 wherein said transmission means is a conventional television transmission channel.

* * * * *